United States Patent [19]

Chen et al.

[11] Patent Number: 5,895,744

[45] Date of Patent: Apr. 20, 1999

[54] METHOD AND APPARATUS FOR MAKING POLYESTER WEB HAVING HIGH ADHESION TO COATED LAYERS

[75] Inventors: Janglin Chen; Gerald G. Reafler, both of Rochester; David A. Glocker, West Henrietta; Mark M. Romach, Rochester; Richard C. Soper, Victor; Evelio A. Perez-Albuerne, Rochester, all of N.Y.

[73] Assignee: Eastman Kodak Company, Rochester, N.Y.

[21] Appl. No.: 08/808,367

[22] Filed: Feb. 28, 1997

[51] Int. Cl.$^6$ .................... G03C 1/795; B01J 19/08; B05D 3/14

[52] U.S. Cl. .................... 430/533; 430/532; 430/523; 422/186.05; 422/907; 204/164; 204/165; 427/562

[58] Field of Search .................... 430/532, 523, 430/533; 422/186.05, 907; 204/164, 165; 427/562

[56] References Cited

U.S. PATENT DOCUMENTS

| | | | |
|---|---|---|---|
| 2,779,684 | 1/1957 | Alles | 430/535 |
| 4,141,735 | 2/1979 | Schrader et al. | 430/141 |
| 4,994,214 | 2/1991 | Stevens et al. | 264/25 |
| 5,326,689 | 7/1994 | Murayama | 430/530 |
| 5,426,980 | 6/1995 | Grace et al. | 428/195 |
| 5,538,841 | 7/1996 | Grace et al. | 430/533 |
| 5,558,843 | 9/1996 | Glocker et al. | 422/186.05 |
| 5,618,659 | 4/1997 | Grace et al. | 430/523 |
| 5,714,308 | 2/1998 | Romach et al. | 430/523 |
| 5,789,145 | 8/1998 | Glocker et al. | 430/527 |

*Primary Examiner*—Mark F. Huff
*Attorney, Agent, or Firm*—Arthur H. Rosenstein

[57] ABSTRACT

Method and apparatus for making thermoplastic web from polyester or polyester blends for subsequent aqueous coating without requirement of an undercoat or primer coat for adhesion of subsequent coatings. Feedstock pellets of polymer, such as polyethylene terephthalate or polyethylene naphthalate, are melted in a screw extruder. Molten polymer is extruded from an extrusion die as a thick, high-viscosity ribbon, which is tempered and stretched in both the machine direction and the transverse direction to form a web of biaxially-oriented polymer of the desired width and thickness. The web is heated to a temperature above $T_g$ to set the biaxial orientation and then is glow discharge treated by passing it through an in-line glow discharge apparatus at atmospheric pressure wherein a stable glow discharge is produced in a gas mixture containing helium between two electrodes connected by an alternating power source operating at a voltage between 0.5 kV and 20 kV at a frequency between 60 Hz and 40 MHz. The web is coated with an aqueous gelatin subbing layer. The coated web then is maintained at elevated temperature. The combination of glow discharge treatment before sub coating and heat treatment after sub coating greatly enhances the adhesion of subsequently-coated aqueous gelatin layers such as photographic emulsions to the web, sufficiently that adhesion-promoting U-coat or primer coat as required in prior base-making methods can be omitted.

19 Claims, 2 Drawing Sheets

METHOD AND APPARATUS FOR MAKING POLYESTER WEB HAVING HIGH ADHESION TO COATED LAYERS

FIELD OF THE INVENTION

The invention relates to method and apparatus for making continuous plastic web, more particularly to method and apparatus for making photographic film base, also known as film support, and most particularly to method and apparatus for making melt-extruded, biaxially-oriented film base containing polyester.

BACKGROUND OF THE INVENTION

Many types of photographic films, for example, x-ray films, graphic arts films, and data recording films, employ a web comprising one or more polyester polymers as the film support. Typical polyesters are polyethylene terephthalate ("PET") and polyethylene naphthalate ("PEN"). Various copolymers and blends of polyesters, or of a polyester polymer with one or more non-polyester polymers, are also known in the art.

In manufacturing biaxially-oriented film base, thermoplastic resin typically is extruded as a relatively thick, high-viscosity, molten ribbon onto a moving receiver surface, typically a polished casting wheel. The temperature of the ribbon may be adjusted, and then the ribbon is stretched in the machine direction (MD orientation), or "drafted", and stretched in the transverse direction (TD orientation), or "tentered" in known fashion to biaxially orient the molecules of the polymer and to achieve the desired final width and thickness of the ribbon as a web or sheet. The longitudinal stretching step can be performed before or after the transverse stretch step. As used hereinbelow, "sheet" can mean either continuous planar polymeric material, commonly referred to as "web," or discrete sections thereof. To enhance the crystallinity and to increase the dimensional stability of the web, the biaxially-oriented polymeric web is "heat-set" by heating it above its glass transition temperature ($T_g$) to near its crystallization point, while maintaining the web under constant tension. The heating and tensioning also ensure that the heat-set film remains transparent upon cooling. To reduce residual stresses and improve planarity after being heat-set, the web may be subjected to a period, typically several minutes, of temperature above $T_g$ but below the heat-set temperature, a process known as "heat relaxation". Typically, the web is rapidly cooled following each of the heat set and heat relax steps to lock in the desired properties. Following heat relaxation, the web is wound into a stock roll of desired length in preparation for subsequent coating of photographic layers. Details of the manufacture of polyester webs are disclosed in, for example, U.S. Pat. Nos. 2,779,684, and 4,141,735.

For some applications, the wound roll of web must also be "annealed" by incubation at elevated temperature for a period, typically, of days to minimize an inherent tendency to adopt an undesirable level of curl when wound in a cassette or camera (so-called "core-set curl"), as disclosed in U.S. Pat. No. 4,141,735. Annealing is particularly effective in preparing polyethylene terephthalate and polyethylene naphthalate for use as a photographic support.

A serious problem in the use of polyester webs for photographic film support is the generally repellent nature of the web surface to the coating and adherence of aqueous subbing layers or emulsions. This problem is overcome typically by the coating of a special chlorine-containing latex undercoat ("U-coat" or "primer") on the polyester surface prior to the coating of a subbing layer or photographic emulsions. Typically, adhesion-promoting layers are applied at an in-line coating station in the base making machine before cutting of the web and winding of the original stock rolls.

A limitation of this known technology is the requirement of coating the U-coat layer. This step introduces opportunities for coating defects and requires a corresponding drying section in the manufacturing line. For PEN film base manufacturing there is the additional limitation that the U-coat must be stable to annealing conditions.

Thus a need exists for an improved method for manufacturing polyester film base, wherein the web does not need to be coated with a U-coat. This is particularly needed for PEN film base that is subjected to annealing conditions.

It is a principal object of the invention to provide an improved method for making film base comprising polyester polymer, and particularly polyethylene naphthalate film base having acceptable planarity, core-set curl, and photographic layer adhesion.

It is a further object of the invention to provide an improved method for making polyester film base, and particularly polyethylene naphthalate film base, having acceptable photographic layer adhesion without resort to an undercoat.

SUMMARY OF THE INVENTION

The apparatus and method of the invention are useful in providing webs comprising polyester polymer, and particularly polyethylene naphthalate webs, having levels of planarity, core-set curl, and adhesion acceptable for use as photographic film base.

Briefly described, a method in accordance with our invention includes in-line atmospheric-pressure glow discharge treatment of the bare web surface, preferably in line with other base-making operations in a base-making machine, and preferably between the steps of heat set and heat relaxation. When a gelatin-containing subbing layer is applied to the treated web surface after the glow discharge treatment, improved adhesion is provided between the subbing layer and the web surface. A U-coat is not required for adhesion, as in previous web-manufacturing methods. Further, we have found an unexpected synergy between glow discharge treatment and heat relaxation. The subbing layer adhesion provided by glow discharge treatment of bare support before coating is very substantially increased by post-coating heat relaxation treatment of the sub-coated web.

The combination of glow discharge treatment, subbing coating, and heat relaxation may be performed in-line in the web-making machine, or they may be performed in a separate operation after the web has been made, if desired. In the latter case, the oriented web making operation may consist essentially of casting, orientation, and heat-setting.

Method and apparatus for providing atmospheric-pressure glow discharge treatment of a web surface are disclosed in U.S. Pat. No. 5,558,843 and in U.S. Pat. No. 5,789,145. Method and apparatus for providing glow discharge treatment of a web surface in-line in a machine wherein a coating is applied subsequently are disclosed in our simultaneously-filed co-pending application, Ser. No. 08/810,497.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which.

DETAILED DESCRIPTION OF THE INVENTION

This invention provides improved apparatus and method for making polyester web having planarity, core-set curl, coatability, and adhesion characteristics suitable for film base. The film base preferably comprises polyester and can also comprise a conductive oxide, a lubricating agent or a magnetic recording layer.

Figure 1:
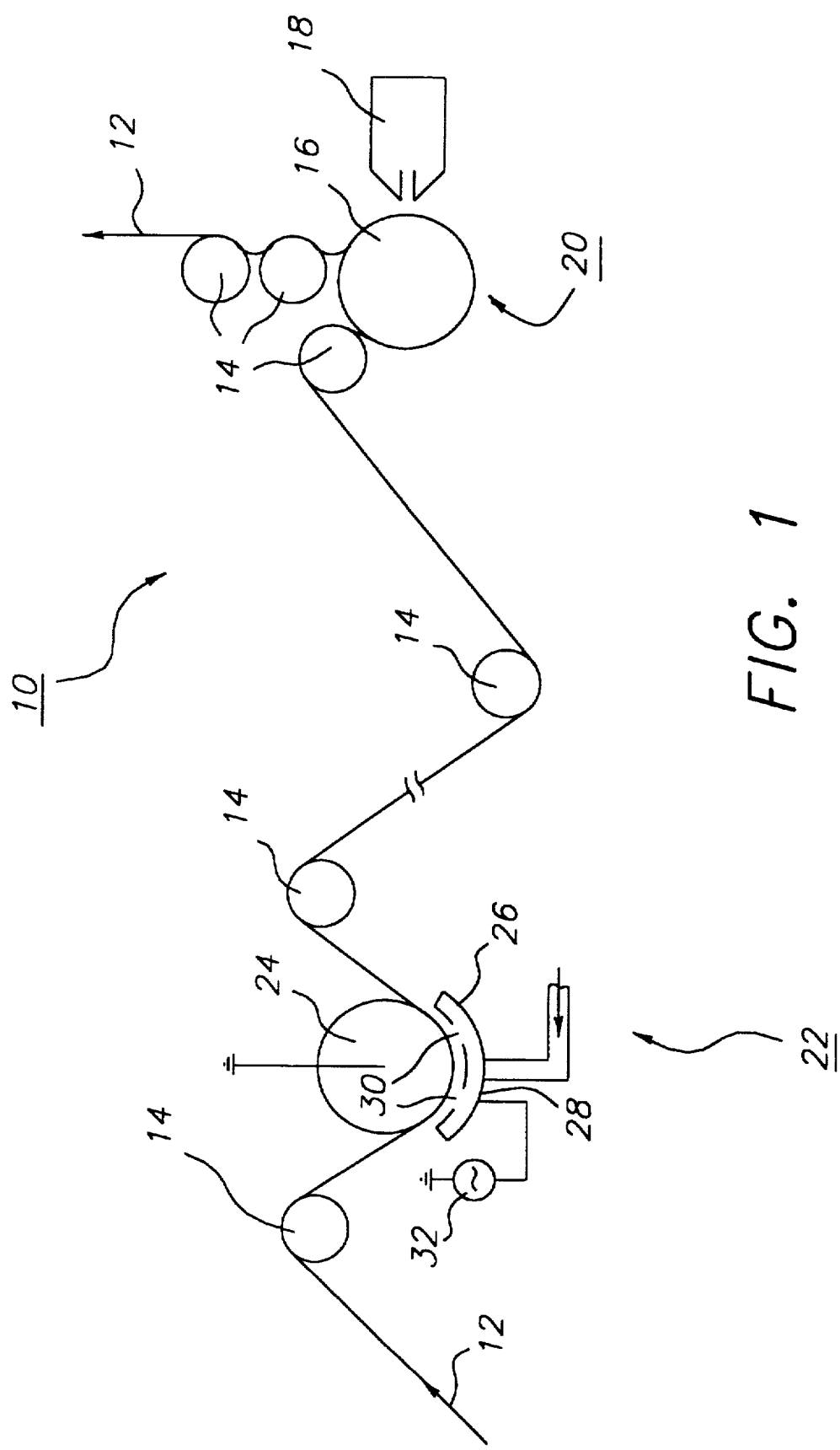
FIG. 1 is a schematic elevational view of a portion of a web coating machine providing in-line atmospheric-pressure glow discharge treatment of the web ahead of the coating application point, substantially as disclosed in the above-referenced application, Ser. No. 08/810,497.

Referring to FIG. 1, a portion of a web coating machine 10 conveys a web substrate 12 containing polyester over rollers 14, which may be either idle rollers or drive rollers, and around a coating backing roller 16 which supports the web for the application of a liquid coating via an applicator 18. Application can be made by any of various known coating applicators, for example, slot die hopper, suction slide hopper also known as a cascade hopper, curtain coating hopper, extrusion/slide hopper, air knife metered applicator, kiss coater, fountain applicator, gravure roller, and offset roller. The combination of coating apparatus defines a coating station 20.

Along the web path a short distance ahead of the coating application point is disposed a glow discharge apparatus 22 similar to that disclosed in U.S. Pat. No. 5,558,843. Other types of glow discharge apparatus may be used, for example, apparatus as disclosed in our pending application, Ser. No. 08/685,353 filed Jul. 23, 1996 now U.S. Pat. No. 5,789,145. Apparatus 22 includes a roller and participates positively in conveying the web through the machine. Apparatus 22 includes a grounded roller electrode 24, a conformable shoe electrode 26 offspaced from roller 24 and having a manifold 28 communicating with the space between the electrodes through passages 30, the manifold 28 being supplied with a gas mixture including helium whereby a stable glow discharge can be maintained at atmospheric pressure between the electrodes when a power source 32 operating at a voltage between 0.5 kV and 20 kV and a frequency between 60 Hz and 40 MHz (megahertz) is connected across electrodes 24 and 26. Preferably, grounded electrode roller 24 and coating backing roller 16 are the same roller, as disclosed and claimed in our simultaneously-filed application, Ser. No. 08/810,497. (They are shown separately here for clarity of presentation.)

Figure 2:
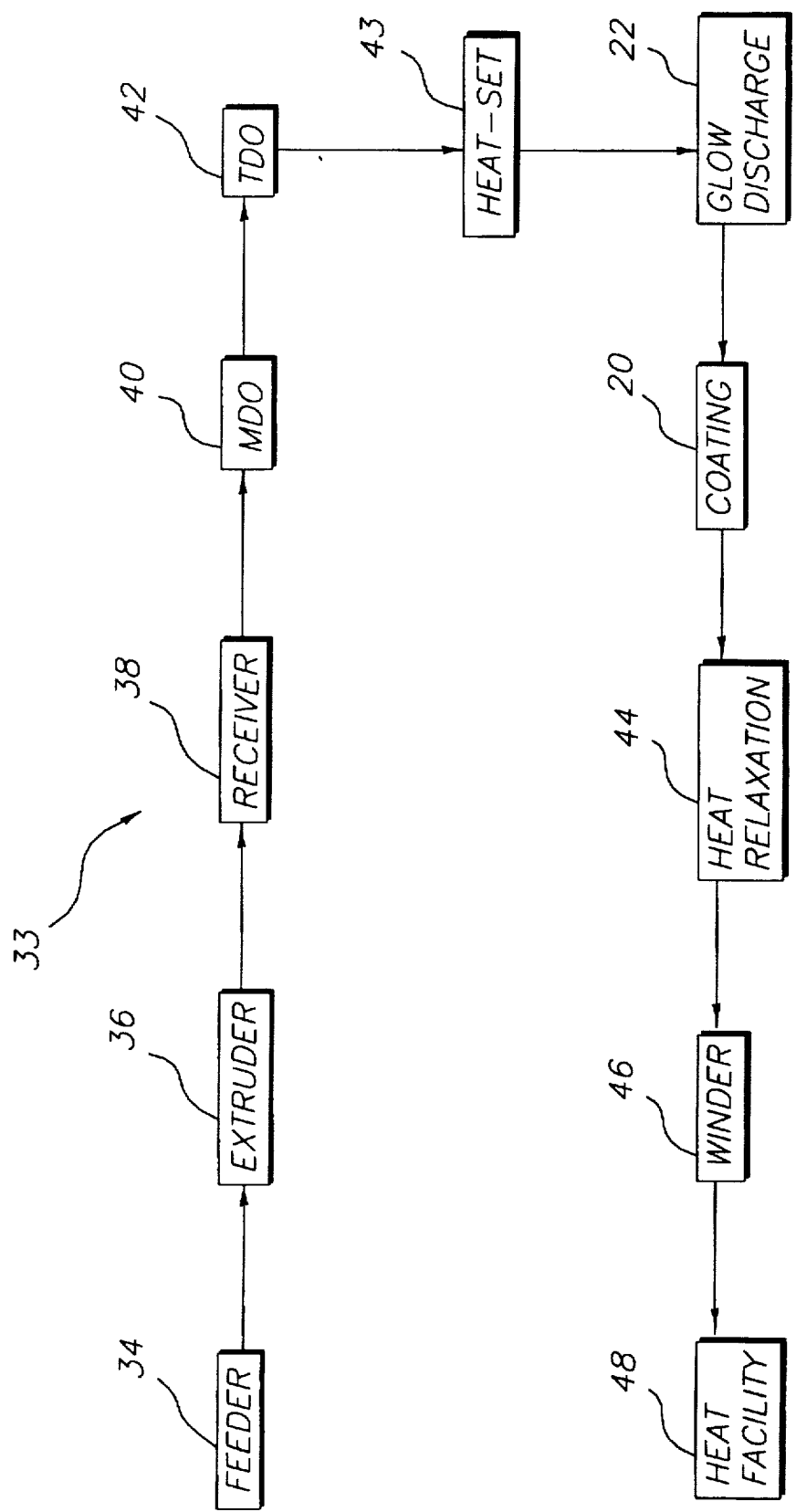
FIG. 2 is a schematic diagram of a web making machine in accordance with the present invention, showing inclusion of the apparatus of the web coating machine shown in FIG. 1.

In FIG. 2, the polyester web treatment and coating apparatus and steps shown in FIG. 1 are combined schematically with conventional web making technology well known to one of ordinary skill in the art in a plurality of apparatus and operations defining a continuous polyester web making machine 33 and web making process in accordance with the present invention.

In operation, a known feeder 34 such as a conveyor supplies pellets of a feedstock comprising polyester polymer or a blend of polyester and non-polyester polymers to a conventional screw extruder 36 which liquefies the pellets by progressive compression and extrudes a continuous ribbon of high-viscosity, molten polymer from an extrusion die onto a moving receiver 38, typically a polished casting wheel, on which the ribbon may be tempered to a lower temperature than the casting temperature. Typically, the ribbon is much narrower and ten times or more thicker than the finished web. The tempered ribbon is stripped from the moving receiver and is stretched longitudinally (drafted) in a conventional machine-direction orienter (MDO) 40 and transversely (tentered) in a conventional transverse-direction orienter (TDO) 42 to provide a web of the desired width and finished thickness, a process known as "orientation" of the web. The order of longitudinal and transverse stretchings may be reversed. After orientation, the properly-dimensioned web is heat set in a heat-setting section 43 at a first temperature above $T_g$ of the resin and below the crystallization temperature. Heating can be anywhere from a few seconds up to 1 minute.

In previous web making methods, a latex U-coat, or primer, is applied to the ribbon prior to orientation to provide satisfactory adhesion of aqueous gelatin layers such as a subbing layer or photographic emulsions when coated subsequently in a photographic coating machine; however, no U-coat is required in accordance with the present invention.

After orientation and heat setting, the web is glow discharge treated with helium and mixtures of helium and other gases by being conveyed through treater 22 as described hereinabove and is thereafter coated on the bare, treated polyester surface with a conventional subbing layer, preferably a formulation containing gelatin, at coating station 20. Because of the glow discharge treatment, the bare surface is suitably coatable to an aqueous gelatin layer without requiring a previously applied U-coat.

After the coating is dried, the coated web is heat relaxed in heat relaxation section 44, which typically includes an insulated chamber having a sinuous web path provided with hot air or radiant heating whereby the web is maintained at a second temperature above the $T_g$ of the polyester polymer or polymer blend, but below the heat-set temperature, for a period of up to 10 minutes. Heat relaxation improves the planarity of the web, and also improves the adhesion of the coated layer as described hereinbelow.

Following heat relaxation, the web is wound at conventional winder 46 into individual stock rolls.

To minimize core-set curl, wound rolls of web may be annealed by incubation in a controlled-heat facility 48 at elevated temperature for a period of a day or more. The annealing time/temperature profile may differ for different polyester webs and can be easily optimized experimentally for any given web. For example, for a particular polyethylene naphthalate web intended as a photographic support, rolls can be annealed at a temperature of 50° C. below $T_g$ to 5° C. below $T_g$ for 0.5 to 1500 hours.

To avoid the need to provide a U-coat, we evaluated the use of in-line glow discharge treatment as an alternative to a U-coat for providing adhesion of subsequently-coated gelatin layers. At machine speeds of interest, the adhesion to, for example, bare PEN support with glow discharge treatment, but without subsequent heat relaxation, was marginally adequate. We also found that heat relaxed support without either previous U-coat or glow discharge treatment showed complete adhesion failure when coated to photographic emulsions.

Surprisingly, however, polyester web such as PEN when subjected to both glow discharge treatment and heat relaxation showed highly superior adhesion to photographic coatings. A substantial and unexpected synergy exists between the two independent treatments, as shown by the following examples:

EXAMPLE 1

A web of bare PEN was glow discharge treated at atmospheric pressure using apparatus as disclosed in U.S. Pat. No. 5,789,145 issued Aug. 4, 1998 and shown in FIGS. 2 and 3 thereof. The energy density of the treatment was 3 Joules/cm$^2$, and the frequency was 450 kHz. (The "energy density" is defined as the power divided by the product of the machine speed and the web width.) Treatment speed was 50 feet/min. Gas provided between the electrodes was a mixture of helium flowing at 80 liters/min and nitrogen flowing at 5 liters/min. The high voltage electrode was spaced 0.8 mm from a grounded metal roller covered with 2 mm of rubber insulation.

EXAMPLE 2

The same experiment as Example 1 was run except glow discharge apparatus as disclosed in U.S. Pat. No. 5,558,843 and shown in FIG. 1 herein was used. The electrode spacing was 2.4 mm, and the energy density was 2 Joules/cm$^2$.

EXAMPLE 3

The same experiment as run in Example 2 was used except a power frequency of 40 kHz was used.

EXAMPLE 4

The same experiment was run as in Example 1 except the treatment speed was 100 ft/min.

CONTROL EXAMPLE

In this experiment the bare PEN web was not glow discharge treated (control).

It is noted that preferred embodiments are when the time between discharge and coating is less than 5 minutes and preferably less than 2 minutes.

Approximately 20 seconds after glow discharge treatment, the various webs from all four Examples were coated with a simple aqueous gelatin subbing solution and dried to remove solvent to obtain a dry coverage of 60 mg/m$^2$. This drying is a separate step from the heat relaxation step. In each Example, a first portion of the coated web was subjected to a heat relaxation treatment of 2 minutes at 140° C., and a second portion of the coated web was not heat relaxed. Furthermore, portions of the web that were not heat treated were placed in an oven and annealed 100° C. for 2 days. As previously mentioned, such annealing is often necessary to control core set curl, particularly in polyethylene naphthalate. All webs were then coated with a conventional photographic layer, dried, and stored at ambient conditions for 10 days.

Adhesion of the photographic layers and subbings was evaluated by immersing samples from each Example in a common photographic developer at 38° C. and rubbing each sample with a Scotchbrite™ pad having a diameter of 3.5 cm, under a load of 1600 g (1.6 Newton/cm$^2$), for a total of 60 rubbing cycles. Under These conditions, representative commercially-available photographic film undergoes a removal of preferably less than 25% of the surface area of the coating. This wet abrasion test is substantially as described in pending application, Ser. No. 08/685,353 filed Jul. 23, 1996.

| Example No. | Glow Discharge | Heat Relaxation | Annealing | Percent Removal |
| --- | --- | --- | --- | --- |
| 1 | Yes | Yes | No | 18 |
|   | Yes | No | No | 24 |
|   | Yes | No | Yes | 22 |
| 2 | Yes | Yes | No | 35 |
|   | Yes | No | No | 88 |
|   | Yes | No | Yes | 19 |
| 3 | Yes | Yes | No | 25 |
|   | Yes | No | No | 100 |
|   | Yes | No | Yes | 48 |
| 4 | Yes | Yes | No | 17 |
|   | Yes | No | No | 100 |
|   | Yes | No | Yes | 22 |
| 5 | No | Yes | No | 100 |
|   | No | No | No | 100 |
|   | No | No | Yes | 100 |

In all cases the combination of glow discharge surface treatment and subsequent heat relaxation produces distinctly superior adhesion despite omission of the U-coat required in the known art of making polyester web suitable for photographic film base. Furthermore, Example 4 shows that glow discharge treatment in combination with either heat relaxation and/or annealing produces excellent adhesion at high web transport speeds, where glow discharge alone is inadequate. High web speeds are highly desirable for improved productivity.

The preferred process and apparatus as described hereinabove are for making thermoplastic web in an essentially continuous process in a web-making machine. However, this invention has also been found to be beneficially applicable in preparing bare, non-U-coated web made by a conventional process on a conventional web-making machine for subsequent photographic-layer coatings. The bare web may be treated in a separate operation to glow discharge, subbing, and heat relaxation, as shown by the above examples.

Further, in applications requiring a non-oriented web, the web-making operation may consist of extruding the ribbon into a nip between opposed rollers, preferably in a train of a plurality of nip rollers, wherein the ribbon is progressively widened and thinned to desired web dimensions. Biaxial stretching is omitted. Such non-oriented web generally is not suitable for photographic support; however, aqueous coatings having high adhesion may be made thereto by treating the web with glow discharge prior to coating, followed by heat relaxation treatment after the coating, in accordance with the present invention.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Parts list 10 portion of web coating machine
12 web substrate
14 rollers
16 coating backing roller
18 coating applicator
20 coating station
22 glow discharge apparatus 24 grounded roller electrode
26 shoe electrode
28 manifold
30 passages
32 power source
33 web making machine
34 pellet supplier
36 screw extruder
38 moving receiver
40 machine-direction orienter
42 transverse-direction orienter
43 heat setting section
44 heat relax section
46 winder
48 annealing incubator

We claim:

1. A method for making a web of thermoplastic resin containing a polyester compound wherein a surface of said web has high adhesion to a coated aqueous layer, comprising the steps of:
   a) liquefying a feedstock of said resin;
   b) extruding a high-viscosity ribbon of said resin;
   c) stretching said ribbon longitudinally to thin and extend said ribbon;
   d) stretching said ribbon transversely to further thin said ribbon, said longitudinal and transverse stretching defining the conversion of said ribbon into a web of biaxially-oriented polymer;
   e) heating said web to a first temperature above the glass transition temperature of said polymer to set said biaxial orientation of said web;
   f) subjecting at least one surface of said web to glow discharge treatment at atmospheric pressure, said treatment including the ionization of helium gas;
   g) coating said aqueous layer to the glow discharge treated web surface; and
   h) heating said web to a second temperature above the glass transition temperature of polymer resin, said second temperature being lower than said first temperature.

2. A method in accordance with claim 1 wherein all of said steps are carried out within a single continuous-process machine.

3. A method in accordance with claim 1 wherein steps a) through e) are carried out in a web making machine, and steps f) through h) are carried out in a web coating machine.

4. A method in accordance with claim 1 wherein said web is a photographic film base.

5. A method in accordance with claim 3 wherein said web is a photographic film base.

6. A method in accordance with claim 4 wherein the base has at least one layer comprising a conductive oxide.

7. A method in accordance with claim 4 wherein the base has at least one layer comprising a lubricating agent.

8. A method in accordance with claim 4 wherein the base has a magnetic recording layer.

9. A method in accordance with claim 1 wherein said coated layer is a subbing layer.

10. A method for making a web of thermoplastic resin containing a polyester compound wherein a surface of said web has high adhesion to a coated aqueous layer, comprising the steps of:
    a) liquefying a feedstock of said resin;
    b) extruding a high-viscosity ribbon of said resin;
    c) stretching said ribbon longitudinally to thin and extend said ribbon;
    d) stretching said ribbon transversely to further thin said ribbon, said longitudinal and transverse stretching defining the conversion of said ribbon into a web of biaxially-oriented polymer;
    e) heating said web to a first temperature above the glass transition temperature of said polymer to set said biaxial orientation of said web;
    f) subjecting at least one surface of said web to glow discharge treatment at atmospheric pressure, said treatment including the ionization of helium gas;
    g) coating said aqueous layer to the glow discharge treated web surface; and
    h) annealing said web at a temperature 50° C. below glass transition temperature of said polymer to 5° C. below glass transition temperature of said resin for 0.5 to 1500 hours.

11. A method in accordance with claim 1 wherein said glow discharge treatment is sustained at a field voltage of between 0.5 kV and 20 kV and a frequency of between 60 Hz and 40 MHz.

12. A method in accordance with claim 1 wherein said thermoplastic resin is selected from the group consisting of polyethylene terephthalate, polyethylene naphthalate, a blend of a polyester resin with a non-polyester resin.

13. A method in accordance with claim 1 wherein said longitudinal stretching step is performed before said transverse stretching step.

14. A method in accordance with claim 1 wherein said transverse stretching step is performed before said longitudinal stretching step.

15. A method in accordance with claim 1 wherein said first heating step is carried out for a period of time of a few seconds up to 1 minute.

16. A method in accordance with claim 1 wherein said second heating step is carried out for a period of time of less than 1 minute to 10 minutes.

17. A method for making a sheet of thermoplastic resin containing a polyester compound, a surface of said sheet having high adhesion to a subsequently-coated aqueous layer, comprising the steps of:
    a) liquefying a feedstock of said resin;
    b) extruding a high-viscosity ribbon of said resin;
    c) thinning said ribbon longitudinally and transversely by conveying it between at least one pair of nip rollers wherein the height of said nip is less than the thickness of said ribbon, said thinned ribbon defining a sheet of desired dimensions;
    d) subjecting at least one surface of said sheet to glow discharge treatment at atmospheric pressure, said treatment including the ionization of helium gas;
    e) coating said aqueous layer to said glow discharge treated surface; and
    f) heating said sheet to increase adhesion of said coated layer to said sheet to a temperature above the glass transition temperature of said resin.

18. A method in accordance with claim 17 wherein said height of said nip is substantially zero.

19. A method in accordance with claim 17 further comprising in said thinning step a plurality of pairs of nip rollers for progressively thinning said ribbon.

* * * * *